US012693850B2

(12) United States Patent
Tateishi et al.

(10) Patent No.: US 12,693,850 B2
(45) Date of Patent: Jul. 28, 2026

(54) MANAGEMENT APPARATUS, MANAGEMENT SYSTEM, MANAGEMENT METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Hiroshi Tateishi, Yokkaichi (JP); Ken Furuto, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 265 days.

(21) Appl. No.: 18/707,712

(22) PCT Filed: Oct. 21, 2022

(86) PCT No.: PCT/JP2022/039363
§ 371 (c)(1),
(2) Date: May 6, 2024

(87) PCT Pub. No.: WO2023/085050
PCT Pub. Date: May 19, 2023

(65) Prior Publication Data
US 2025/0004749 A1 Jan. 2, 2025

(30) Foreign Application Priority Data
Nov. 9, 2021 (JP) ................................. 2021-182571

(51) Int. Cl.
*G06F 8/65* (2018.01)
*G06F 11/14* (2006.01)
(Continued)

(52) U.S. Cl.
CPC ............ *G06F 8/65* (2013.01); *G06F 11/1433* (2013.01); *H04W 4/40* (2018.02); *H04W 88/06* (2013.01)

(58) Field of Classification Search
CPC ........ G06F 8/65; G06F 11/1433; H04W 4/40; H04W 88/06
See application file for complete search history.

(56) References Cited

U.S. PATENT DOCUMENTS

2005/0216530 A1* 9/2005 Meller ..................... G06F 8/658
707/999.203
2006/0069825 A1* 3/2006 Hodder .............. G06K 15/1805
710/72
(Continued)

FOREIGN PATENT DOCUMENTS

JP 2013-112120 A 6/2013
JP 2019-164809 A 9/2019
(Continued)

OTHER PUBLICATIONS

International Search Report, Application No. PCT/JP2022/039363, mailed Dec. 6, 2022. ISA/Japan Patent Office.

*Primary Examiner* — Vance M Little
(74) *Attorney, Agent, or Firm* — Brooks Kushman P.C.

(57) ABSTRACT

A management apparatus to be mounted on a vehicle that includes: a first communication unit; a second communication unit; a third communication unit; and a control unit configured to cause the first communication unit to transmit the update data received by the second communication unit or the third communication unit to the target ECU. The control unit performs switching from a first path through which the update data received by one of the second communication unit and the third communication unit is transmitted from the first communication unit to a second path through which the update data received by the other of (Continued)

the second communication unit and the third communication unit is transmitted from the first communication unit.

15 Claims, 7 Drawing Sheets

(51) Int. Cl.
    *H04W 4/40*          (2018.01)
    *H04W 88/06*       (2009.01)

(56)               References Cited

U.S. PATENT DOCUMENTS

| | | | |
|---|---|---|---|
| 2012/0166626 A1* | 6/2012 | Rai | H04L 12/6418 709/224 |
| 2015/0072662 A1* | 3/2015 | Chandrasekaran | H04W 76/23 455/414.1 |
| 2020/0210167 A1* | 7/2020 | Ogawa | H04L 12/46 |
| 2020/0233654 A1 | 7/2020 | Matsumoto et al. | |
| 2021/0001792 A1 | 1/2021 | Noda | |
| 2021/0165649 A1 | 6/2021 | Harata et al. | |
| 2021/0397433 A1* | 12/2021 | Itatsu | H04L 67/34 |

FOREIGN PATENT DOCUMENTS

| | | | |
|---|---|---|---|
| JP | 2020-135468 A | 8/2020 | |
| JP | 2020-205542 A | 12/2020 | |
| WO | 2016-034575 A1 | 3/2016 | |
| WO | 2019-187535 A1 | 10/2019 | |

* cited by examiner

21 — Control unit

24 — Management unit

25 — Communication determining unit

26 — Path selecting unit

27 — Switching unit

28 — Output unit

FIG. 5

| Target ECU | Transmission interval | Predetermined time A1 | Predetermined time A2 |
|---|---|---|---|
| ECU31 | t1 | F1 × t1 | Tout |
| ECU32 | t2 | F1 × t2 | Tout |
| ECU33 | t3 | F1 × t3 | Tout |
| ⋮ | ⋮ | ⋮ | ⋮ |

FIG. 7

| Type of ECU | Update content | Priority level 1 | Priority level 2 | Priority level 3 | Priority level 4 | Priority level 5 | Priority level 6 |
|---|---|---|---|---|---|---|---|
| ECU31 | Application | DoCAN52 | DoIP53 | TCU41 | Memory 72 | Terminal 73 | Wireless communication 75 |
| ECU32 | Application | DoIP53 | DoCAN52 | TCU41 | Memory 72 | Terminal 73 | Wireless communication 75 |
| ECU33 | Application | DoIP53 | DoCAN52 | TCU41 | Memory 72 | Terminal 73 | Wireless communication 75 |
| Information acquisition device 42 | Application | DoCAN52 | DoIP53 | TCU41 | Memory 72 | Terminal 73 | Wireless communication 75 |
|  | Memory 72 | Memory 72 | Terminal 73 | DoCAN52 | DoIP53 | TCU41 |  |
| ... |  |  |  |  |  |  |  |

MANAGEMENT APPARATUS, MANAGEMENT SYSTEM, MANAGEMENT METHOD, AND COMPUTER PROGRAM

CROSS-REFERENCE TO RELATED APPLICATIONS

This application is the U.S. national stage of PCT/JP2022/039363 filed on Oct. 21, 2022, which claims priority of Japanese Patent Application No. JP 2021-182571 filed on Nov. 9, 2021, the contents of which are incorporated herein.

TECHNICAL FIELD

The present disclosure relates to a management apparatus, a management system, a management method, and a computer program.

BACKGROUND

Heretofore, a technique has been known for updating a program or data of an ECU (Electronic Control Unit) mounted on a vehicle. For example, in JP 2013-112120A, a technique for a gateway ECU to relay an update program transmitted from an external tool to a plurality of ECUs is disclosed.

In JP 2019-20866A, a technique for selecting a communication path according to software to be updated is disclosed. JP 2020-27635A discloses a technique for, when program rewriting processing in an ECU is interrupted, specifying a retrial point when resuming the program rewriting.

When a communication abnormality such as a communication disruption occurs between an update data provider (e.g., external tool) and a gateway while the gateway ECU is transmitting update data to another ECU, conventionally, updating in the other ECU is waited for until the communication abnormality is resolved, and therefore it took time to complete the updating.

The present disclosure has been made in view of such circumstances, and its purpose is to reduce the time taken to update an ECU.

SUMMARY

A management apparatus of the present disclosure is a management apparatus to be mounted on a vehicle that includes: a first communication unit configured to communicate with a target ECU that is to be updated out of one or more ECUs that are mounted on the vehicle; a second communication unit that is configured to communicate with an onboard vehicle external communication device, and is able to receive update data for the target ECU that is transmitted from a first external device external to the vehicle to the vehicle external communication device via a network; a third communication unit that is configured to communicate with a second external device external to the vehicle, and is able to receive the update data; and a control unit configured to cause the first communication unit to transmit the update data received by the second communication unit or the third communication unit to the target ECU. The control unit performs switching from a first path through which the update data received by one of the second communication unit and the third communication unit is transmitted from the first communication unit to a second path through which the update data received by the other of the second communication unit and the third communication unit is transmitted from the first communication unit.

A management method of the present disclosure is a management method for a management apparatus to manage updating of one or more ECUs that are mounted on a vehicle. The management apparatus includes: a first communication unit configured to communicate with a target ECU that is to be updated out of the one or more ECUs; a second communication unit that is configured to communicate with an onboard vehicle external communication device, and is able to receive update data for the target ECU that is transmitted from a first external device external to the vehicle to the vehicle external communication device via a network; and a third communication unit that is configured to communicate with a second external device external to the vehicle, and is able to receive the update data. The management method includes a step of performing switching from a first path through which the update data received by one of the second communication unit and the third communication unit is transmitted from the first communication unit to a second path through which the update data received by the other of the second communication unit and the third communication unit is transmitted from the first communication unit.

A computer program of the present disclosure is a computer program for a management apparatus to manage updating of one or more ECUs that are mounted on a vehicle. The management apparatus includes: a first communication unit configured to communicate with a target ECU that is to be updated out of the one or more ECUs; a second communication unit that is configured to communicate with an onboard vehicle external communication device, and is able to receive update data for the target ECU that is transmitted from a first external device external to the vehicle to the vehicle external communication device via a network; and a third communication unit that is configured to communicate with a second external device external to the vehicle, and is able to receive the update data. The computer program causes a computer to execute a step of performing switching from a first path through which the update data received by one of the second communication unit and the third communication unit is transmitted from the first communication unit to a second path through which the update data received by the other of the second communication unit and the third communication unit is transmitted from the first communication unit.

Advantageous Effects

According to the present disclosure, the time taken to update an ECU can be reduced.

BRIEF DESCRIPTION OF DRAWINGS

FIG. 5 is a table illustrating predetermined times according to the embodiment.

FIG. 7 is a table illustrating priority levels according to a modification.

DETAILED DESCRIPTION OF PREFERRED EMBODIMENTS

Figure 1:
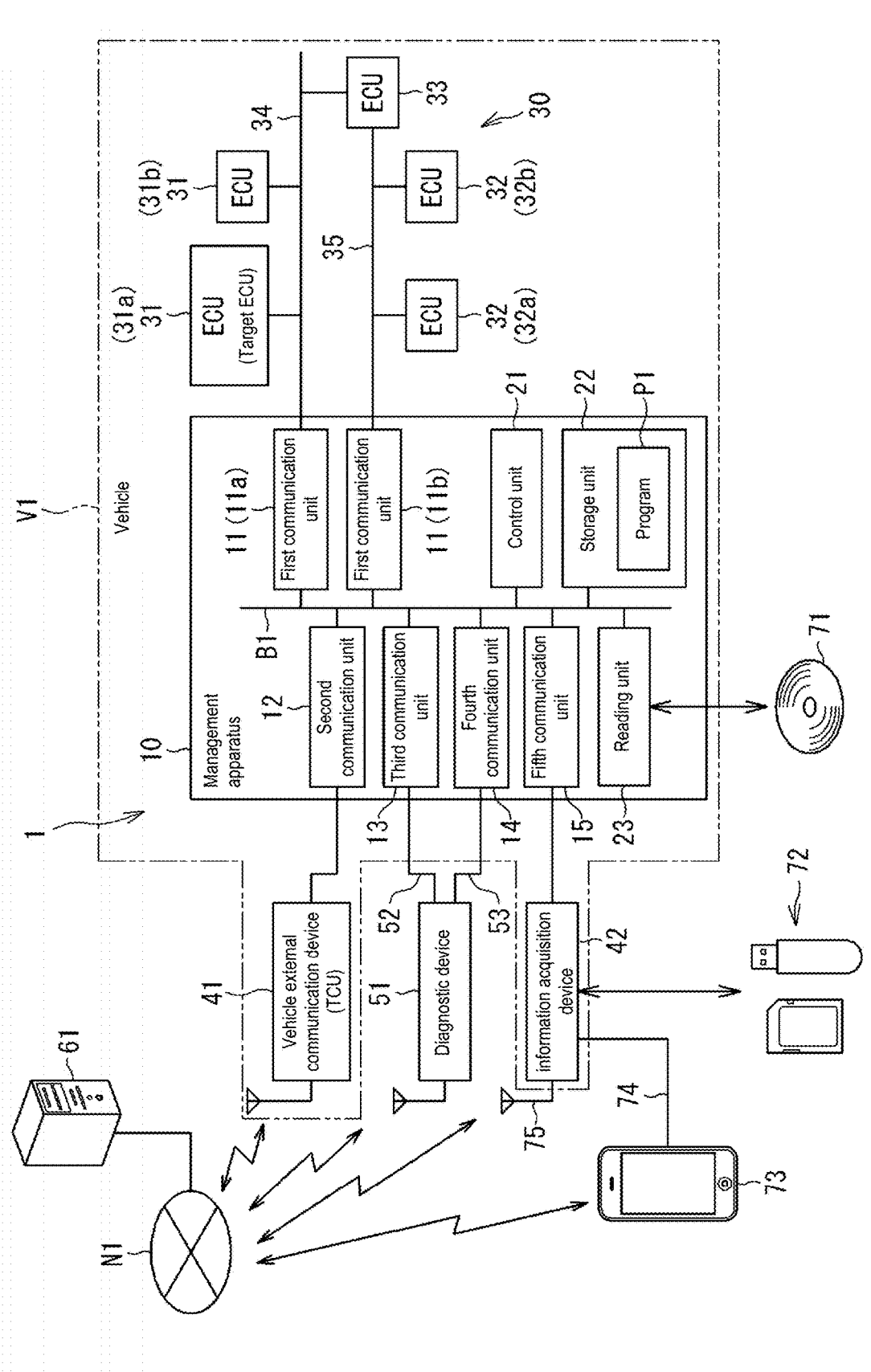
FIG. 1 is a schematic diagram illustrating a management system according to an embodiment.

The summary of an embodiment of the present disclosure will be listed and described below.

A management apparatus of the present disclosure is a management apparatus to be mounted on a vehicle that includes: a first communication unit configured to communicate with a target ECU that is to be updated out of one or more ECUs that are mounted on the vehicle; a second communication unit that is configured to communicate with an onboard vehicle external communication device, and is able to receive update data for the target ECU that is transmitted from a first external device external to the vehicle to the vehicle external communication device via a network; a third communication unit that is configured to communicate with a second external device external to the vehicle, and is able to receive the update data; and a control unit configured to cause the first communication unit to transmit the update data received by the second communication unit or the third communication unit to the target ECU. The control unit performs switching from a first path through which the update data received by one of the second communication unit and the third communication unit is transmitted from the first communication unit to a second path through which the update data received by the other of the second communication unit and the third communication unit is transmitted from the first communication unit.

With this configuration, even when a communication abnormality or the like occurs, the path for transmitting the update data to the target ECU can be switched, and therefore time taken for updating can be reduced.

The control unit may determine a communication disruption if, in a period from when data at the head of a plurality of pieces of divided data obtained by dividing the update data is received through the first path until when data at the end of the plurality of pieces of divided data is received through the first path, the update data is not received through the first path for a predetermined time, and upon determining the communication disruption, the control unit may perform switching from the first path to the second path.

With this configuration, the path for transmitting the update data to the target ECU can be switched when a communication disruption has been determined, and therefore time taken for updating can be reduced.

The control unit may cause the first communication unit to sequentially transmit the plurality of pieces of divided data at a transmission interval set according to the target ECU, and the predetermined time may be a time that is twice the transmission interval or more.

As a result of making determination with reference to a predetermined time set according to the target ECU, the control unit can accurately determine a communication disruption.

The first communication unit may communicate with a plurality of the target ECUs, and the predetermined time may be a time that is set as a same value for the plurality of target ECUs.

Because the predetermined time has the same value for a plurality of target ECUs, the control load of the control unit 21 can be reduced.

When the communication disruption has been determined, the control unit may acquire a retrial point of the update data for resuming updating of the target ECU from partway through the update data, and when switching from the first path to the second path has been performed, the control unit may cause the first communication unit to transmit, out of the pieces of divided data, data from the retrial point onward to the target ECU.

With this configuration, the amount of communication taken for updating can be reduced, along with the time taken for updating being reduced, compared with the case where the update data is again transmitted from the beginning.

When the communication disruption has been determined, the control unit may determine whether updating of the target ECU is to be resumed from partway through the update data or updating of the target ECU is to be started again from the beginning of the update data, according to the target ECU or the update data.

With this configuration, the mode for resuming updating of the target ECU can be selected according to the target ECU or update data.

The control unit may acquire the retrial point based on information regarding a transmission order of the divided data transmitted from the first communication unit through the first path before the communication disruption is determined.

The control unit may cause the second communication unit or third communication unit to transmit a signal for making a request to the first external device or the second external device, which is a communication destination of the second path, for data from the retrial point onward, out of the pieces of divided data.

The second external device may be a diagnostic device that can receive the update data from the first external device via a network.

The first path may be a path for transmitting the update data received by the second communication unit from the first communication unit, the second path may be a path for transmitting the update data received by the third communication unit from the first communication unit, and when performing switching from the first path to the second path, the control unit may request the diagnostic device to acquire, from the first external device, update data having version information that is the same as that of the update data transmitted through the first path.

With this configuration, the update data of the diagnostic device can be synchronized with the update data of the first external device.

The management apparatus further includes at least one of a fourth communication unit configured to communicate with the second external device through a communication line conforming to a communication protocol that is different from that of the third communication unit, and a fifth communication unit configured to communicate with an information acquisition device that acquires the update data from the first external device via a network or from a recording medium. The control unit may perform switching from the first path to the second path, a third path through which the update data received by the fourth communication unit is transmitted from the first communication unit, or a fourth path through which the update data received by the fifth communication unit is transmitted from the first communication unit.

With this configuration, switching from three or more update data paths to a plurality of paths is possible.

The first communication unit may communicate with a plurality of the target ECUs, and the control unit may determine a switching destination path according to priority levels of paths set for each of the plurality of target ECUs.

With this configuration, switching to a more preferable path is possible for each of the plurality of target ECUs.

A management system of the present disclosure is an onboard management system, and includes: the management apparatus according to any one of (1) to (12) described above; the target ECU connected to the first communication unit; and the vehicle external communication device connected to the second communication unit.

A management method of the present disclosure is a management method for a management apparatus to manage updating of one or more ECUs that are mounted on a vehicle. The management apparatus includes: a first communication unit configured to communicate with a target ECU that is to be updated out of the one or more ECUs; a second communication unit that is configured to communicate with an onboard vehicle external communication device, and is able to receive update data for the target ECU that is transmitted from a first external device external to the vehicle to the vehicle external communication device via a network; and a third communication unit that is configured to communicate with a second external device external to the vehicle, and is able to receive the update data. The management method includes a step of performing switching from a first path through which the update data received by one of the second communication unit and the third communication unit is transmitted from the first communication unit to a second path through which the update data received by the other of the second communication unit and the third communication unit is transmitted from the first communication unit.

With this configuration, even when a communication abnormality or the like has occurred, for example, the path for transmitting the update data to the target ECU can be switched, and therefore the time taken for updating can be reduced.

A computer program of the present disclosure is a computer program for a management apparatus to manage updating of one or more ECUs that are mounted on a vehicle. The management apparatus includes: a first communication unit configured to communicate with a target ECU that is to be updated out of the one or more ECUs; a second communication unit that is configured to communicate with an onboard vehicle external communication device, and is able to receive update data for the target ECU that is transmitted from a first external device external to the vehicle to the vehicle external communication device via a network; and a third communication unit that is configured to communicate with a second external device external to the vehicle, and is able to receive the update data. The computer program causes a computer to execute a step of performing switching from a first path through which the update data received by one of the second communication unit and the third communication unit is transmitted from the first communication unit to a second path through which the update data received by the other of the second communication unit and the third communication unit is transmitted from the first communication unit.

With this configuration, even when a communication abnormality or the like has occurred, for example, the path for transmitting the update data to the target ECU can be switched, and therefore the time taken for updating can be reduced.

Details of an embodiment of the present disclosure will be described below with reference to the drawings.

Management System

FIG. 1 is a schematic diagram illustrating a management system 1 according to the present embodiment.

The management system 1 is a system mounted on a vehicle V1. The vehicle V1 is an automobile, for example, but the type of the vehicle V1 is not specifically limited. The management system 1 includes a management apparatus 10, one or more ECUs 30, a vehicle external communication device 41, and an information acquisition device 42.

The management apparatus 10 is an apparatus that updates (reprograms) the ECUs 30 based on update data provided by later-described vehicle external devices such as an external device 61 and a diagnostic device 51. The management apparatus 10 is an apparatus that relays update data input from the vehicle external communication device 41, the information acquisition device 42, or a later-described diagnostic device 51 to the ECUs 30, and is an ECU that functions as a central gateway (CGW). The management apparatus 10 comprehensively manages updating of the ECUs 30, and therefore may also be referred to as a "reprogramming master".

A network N1 is a network outside the vehicle V1 such as the Internet, for example. The network N1 may also be a relatively local network such as a WAN (Wide Area Network) or a LAN (Local Area Network).

The external device 61 is an example of a "first external device" of the present disclosure. The external device 61 is a server, for example, and includes a control unit (not illustrated), a storage unit (not illustrated), and a communication unit (not illustrated). The communication unit of the external device 61 communicates with the vehicle external communication device 41, the information acquisition device 42, and the diagnostic device 51 via the network N1. The storage unit of the external device 61 stores a program or data for controlling the ECUs 30, for example. The manufacturer of the ECUs 30 modifies the program or data as necessary, and the modified program or data is stored in the storage unit of the external device 61 as needed, for example. The control unit of the external device 61 delivers the modified program or data to the management system 1, as described later, as update data. Therefore, the external device 61 may also be referred to as an OTA (Over The Air) server.

The update data may be a program (application program) for updating software of the ECUs 30, or may also be a program (firmware program) for updating firmware of the ECUs 30. Also, the update data may also be data for updating parameter information stored in the ECUs 30. The parameter information is data to be used in software realized in the ECUs 30, and specifically, is map information, a control parameter, or the like.

The ECUs 30 are devices (operation control ECUs) for controlling the units (e.g., braking device, door, battery, air conditioner) of the vehicle V1, for example. The functions of the ECUs 30 are not specifically limited, and the ECUs 30 may also be devices (recognition control ECU) that are connected to existing sensors (not illustrated), and monitor the states of the units of the vehicle V1. The ECUs 30 are a collective name of later-described first ECU 31, second ECU 32, and third ECU 33.

The first ECU 31 is an ECU that is connected to the management apparatus 10 via a communication line 34. In the following description, the first ECU 31 may also be referred to as an "ECU 31". In FIG. 1, two first ECUs 31a and 31b are illustrated, but the number of first ECUs 31 is not specifically limited, and may be one or plural. The communication line 34 is for an onboard network conforming to the first communication standard, and is for a network conforming to the CAN communication standard, for example.

The second ECU 32 is an ECU that is connected to the management apparatus 10 via a communication line 35. In the following description, the second ECU 32 may also be referred to as an "ECU 32". In FIG. 1, two second ECUs 32a and 32b are illustrated, but the number of second ECU 32 is not specifically limited, and may be one or more. The communication line 35 is for an onboard network conforming to the second communication standard that is different from the first communication standard, and is for a network conforming to Ethernet (registered trademark).

The third ECU 33 is an ECU that is connected to the management apparatus 10 via the communication line 34, and is also connected to the management apparatus 10 via the communication line 35. In the following description, the third ECU 33 may also be referred to as an "ECU 33". In FIG. 1, one third ECU 33 is illustrated, but the number of third ECUs 33 is not specifically limited, and may be one or more.

The vehicle external communication device 41 is a TCU (Telematics Communication Unit), for example, and may also be referred to as a "TCU 41". The vehicle external communication device 41 may also be an ECU, and be included in the ECUs 30 to be updated. The vehicle external communication device 41 performs wireless communication with the external device 61 via the network N1 in accordance with a communication standard such as 3G (third generation mobile communication system), 4G/LTE (fourth generation mobile communication system/Long Term Evolution: LTE is a registered trademark), or 5G (fifth generation mobile communication system).

The information acquisition device 42 is a device that can acquire update data from at least one of a recording medium 72, a terminal 73, and the external device 61. The information acquisition device 42 may also be an ECU, and be included in the ECUs 30 to be updated. More specifically, the information acquisition device 42 has a function as a navigation device, and guides a driver of the vehicle V1 about the path found out based on map information or the like.

The recording medium 72 is flash memories in a form of a memory card, a USB memory, or the like, for example. The recording medium 72 is connected to terminals provided in the information acquisition device 42. The terminal 73 is a mobile terminal such as a smartphone, a tablet terminal, or a notebook computer, for example. The terminal 73 is connected to the information acquisition device 42 via the communication line 74. The communication line 74 may be a wired communication line such as a USB cable, or may also be a wireless communication line such as Bluetooth (registered trademark). The information acquisition device 42 includes a wireless communication interface 75 that enables connection to the network N1, and acquires update data from the external device 61 via the network N1 in accordance with a wireless communication standard such as Wi-Fi (registered trademark), for example.

The diagnostic device 51 is an example of a "second external device" of the present disclosure. The diagnostic device 51 (may also be referred to as a "diagnostic tool") is a device to be used by a vehicle maintenance operator (e.g., dealer) that performs maintenance of the vehicle V1. The diagnostic device 51 is a general information terminal such as a personal computer, a tablet terminal, or a smartphone in which an application for diagnosing the units (ECUs 30 etc.) of the management system 1 is installed, for example. Also, the diagnostic device 51 may be a dedicated terminal in which the application is installed.

The diagnostic device 51 includes a control unit (not illustrated), a storage unit (not illustrated) and a communication unit (not illustrated). When performing maintenance of the management system 1 using the diagnostic device 51, the communication unit of the diagnostic device 51 is connected to the management apparatus 10 via a communication line 52 and a communication line 53. The communication line 52 is for a network conforming to the first communication standard (e.g., CAN), similarly to the communication line 34. The communication line 53 is for a network conforming to the second communication standard (e.g., Ethernet), similarly to the communication line 35. The communication unit of the diagnostic device 51 communicates with the external device 61 via the network N1 in accordance with a wireless communication standard such as Wi-Fi, for example.

Management Apparatus 10

The management apparatus 10 includes a first communication units 11a and 11b, a second communication unit 12, a third communication unit 13, a fourth communication unit 14, a fifth communication unit 15, a control unit 21, a storage unit 22, and a reading unit 23. The units included in the management apparatus 10 are electrically connected to each other via a bus B1, for example.

The first communication unit 11a communicates with the ECUs 31 and 33 via the communication line 34. The first communication unit 11b communicates with the ECUs 32 and 33 via the communication line 35. When no particular distinction is made between the first communication units 11a and 11b, they are simply referred to as "first communication units 11". The second communication unit 12 communicates with the TCU 41. The standard of communication between the second communication unit 12 and the TCU 41 is not specifically limited, and may be a standard such as CAN or Ethernet, for example.

The third communication unit 13 communicates with the diagnostic device 51 via the communication line 52. The fourth communication unit 14 communicates with the diagnostic device 51 via the communication line 53. The fifth communication unit 15 communicates with the information acquisition device 42. The standard of communication between the fifth communication unit 15 and the information acquisition device 42 is not specifically limited, and may be a standard such as CAN or Ethernet, for example.

The control unit 21 is a CPU (Central Processing Unit). The control unit 21 may also be an integrated circuit such as an FPGA (Field-Programmable Gate Array), for example. The control unit 21 realizes later-described various functions by executing various types of computation and processing based on a later-described computer program P1 from the storage unit 22.

The storage unit 22 includes a volatile memory and a nonvolatile memory, and stores various types of data. The volatile memory is a RAM (Random Access Memory), for example. The nonvolatile memory includes a flash memory, an HDD (Hard Disk Drive), an SSD (Solid State Drive), a ROM (Read Only Memory), and the like.

The reading unit 23 reads out information from a computer-readable recording medium 71. The recording medium 71 is an optical disk such as a CD or a DVD, or a USB flash memory, for example. The reading unit 23 is an optical drive or a USB terminal, for example. The computer program P1 is recorded in the recording medium 71, and the computer program P1 is stored in the nonvolatile memory of the storage unit 22 by causing the reading unit 23 to read the recording medium 71.

Figure 2:
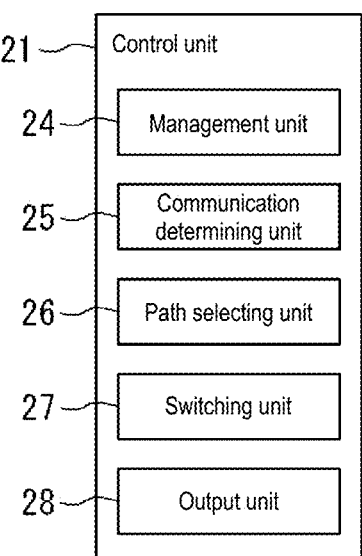
FIG. 2 is a block diagram illustrating a functional configuration of a control unit according to the embodiment.

FIG. 2 is a block diagram illustrating a functional configuration of the control unit 21. The control unit 21 includes a management unit 24, a communication determining unit 25, a path selecting unit 26, a switching unit 27, and an output unit 28. The management unit 24 manages the output state of update data. For example, the management unit 24 stores the number of pieces of later-described divided data delivered from the management apparatus 10 to the ECUs 30 in the storage unit 22, for example. The communication determining unit 25 determines a communication disruption in the second communication unit 12, the third communication unit 13, the fourth communication unit 14, and the fifth communication unit 15.

When a communication disruption is determined in at least one of the second communication unit 12, the third communication unit 13, the fourth communication unit 14, and the fifth communication unit 15, the path selecting unit 26 selects a communication path that passes through another communication unit according to preset priority levels, for example. The switching unit 27 switches the communication path by outputting various requests to a connection destination of the communication path selected by the path selecting unit 26. The output unit 28 outputs update data to an ECU 30 to be updated based on management content of the management unit 24.

Path of Update Data

The management apparatus 10 has a plurality of paths for transmitting and receiving update data. The path for transmitting, from the first communication unit 11, update data received by one of the second communication unit 12 and the third communication unit 13 is referred to as a "first path R1". Also, the path for transmitting, from the first communication unit 11, update data received by the other of the second communication unit 12 and the third communication unit 13 is referred to as a "second path R2". When the first path R1 is a path for transmitting update data received by the second communication unit 12 from the first communication unit 11, the second path R2 is a path for transmitting update data received by the third communication unit 13 from the first communication unit 11.

Also, the path for transmitting update data received by the fourth communication unit 14 from the first communication unit 11 is referred to as a "third path R3", and the path for transmitting update data received by the fifth communication unit 15 from the first communication unit 11 is referred to as a "fourth path R4". The management apparatus 10 shown in FIG. 1 has four paths, namely the first path R1 to fourth path R4, but the number of paths is not specifically limited as long as it is at least two. For example, the management apparatus 10 may have only the first path R1 and the second path R2, or may also have a path other than these four paths R1 to R4.

Management Method

Figure 3:
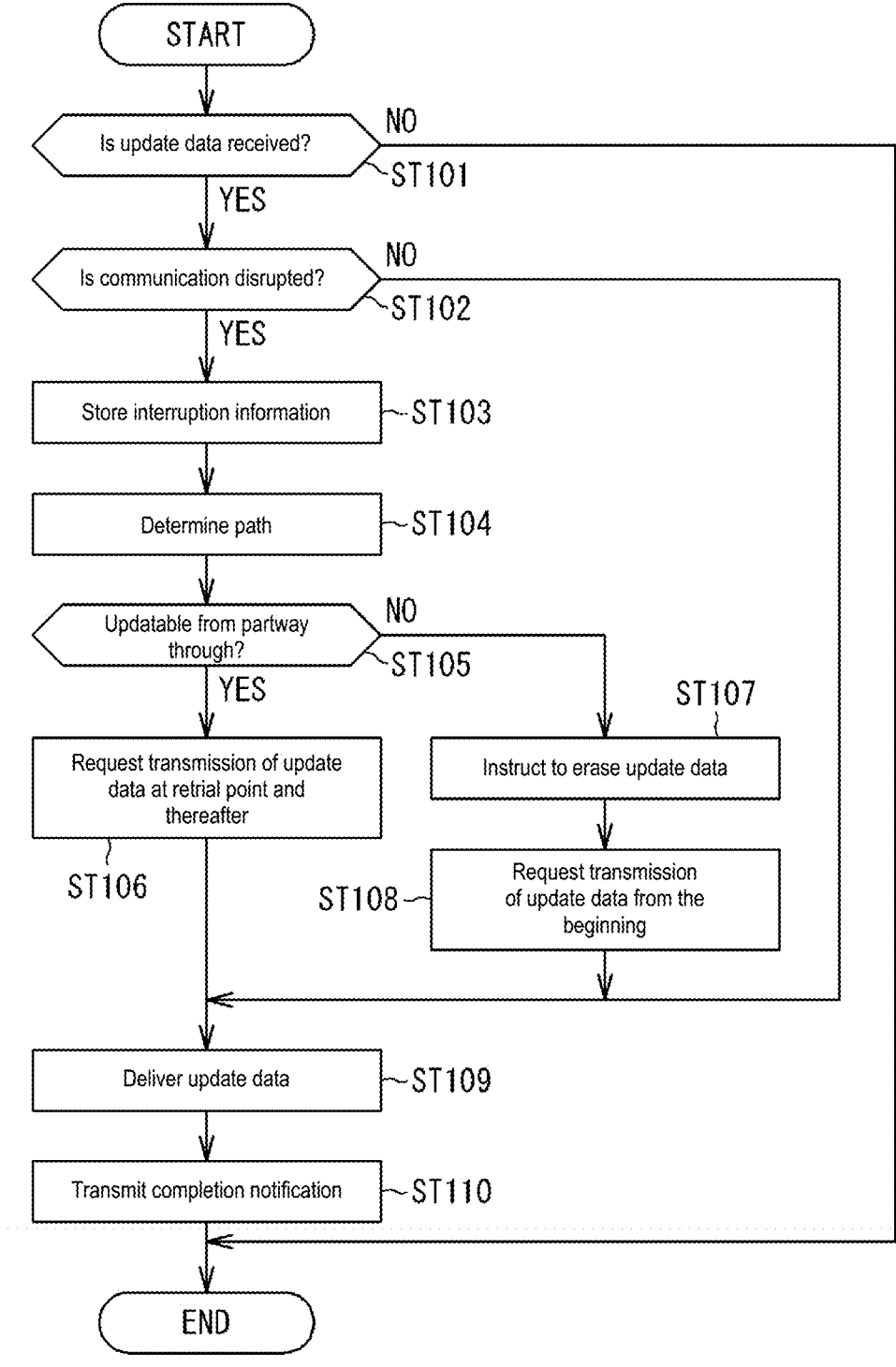
FIG. 3 is a flowchart illustrating a management method according to the embodiment.

FIG. 3 is a flowchart illustrating a management method according to the embodiment. The flowchart in FIG. 3 illustrates an operation procedure of the control unit 21. The operation procedure is realized by the control unit 21 reading out the computer program P1 from the storage unit 22 and executing various types of computation and processing. The order of the steps shown in FIG. 3 may be changed as appropriate.

The management method described below is a method of managing input/output of update data for updating a target ECU (ECU 31a in the example in FIG. 4), which is one of the ECUs 30 that is to be updated. The management method is executed on a vehicle V1 that is stopped, for example. Note that the management method may also be executed on the vehicle V1 that is traveling. The management method is executed in a manufacturing facility of the vehicle V1, before shipping the vehicle V1, for example. Note that the management method may also be executed at the time of regular or irregular inspection of the vehicle V1 in a vehicle maintenance factory of the vehicle V1, or may also be executed at a user parking place of the vehicle V1 on a daily basis.

First Exemplary Control

IG. 4 is a sequence diagram illustrating the management method according to the embodiment (first exemplary control).

Figure 4:
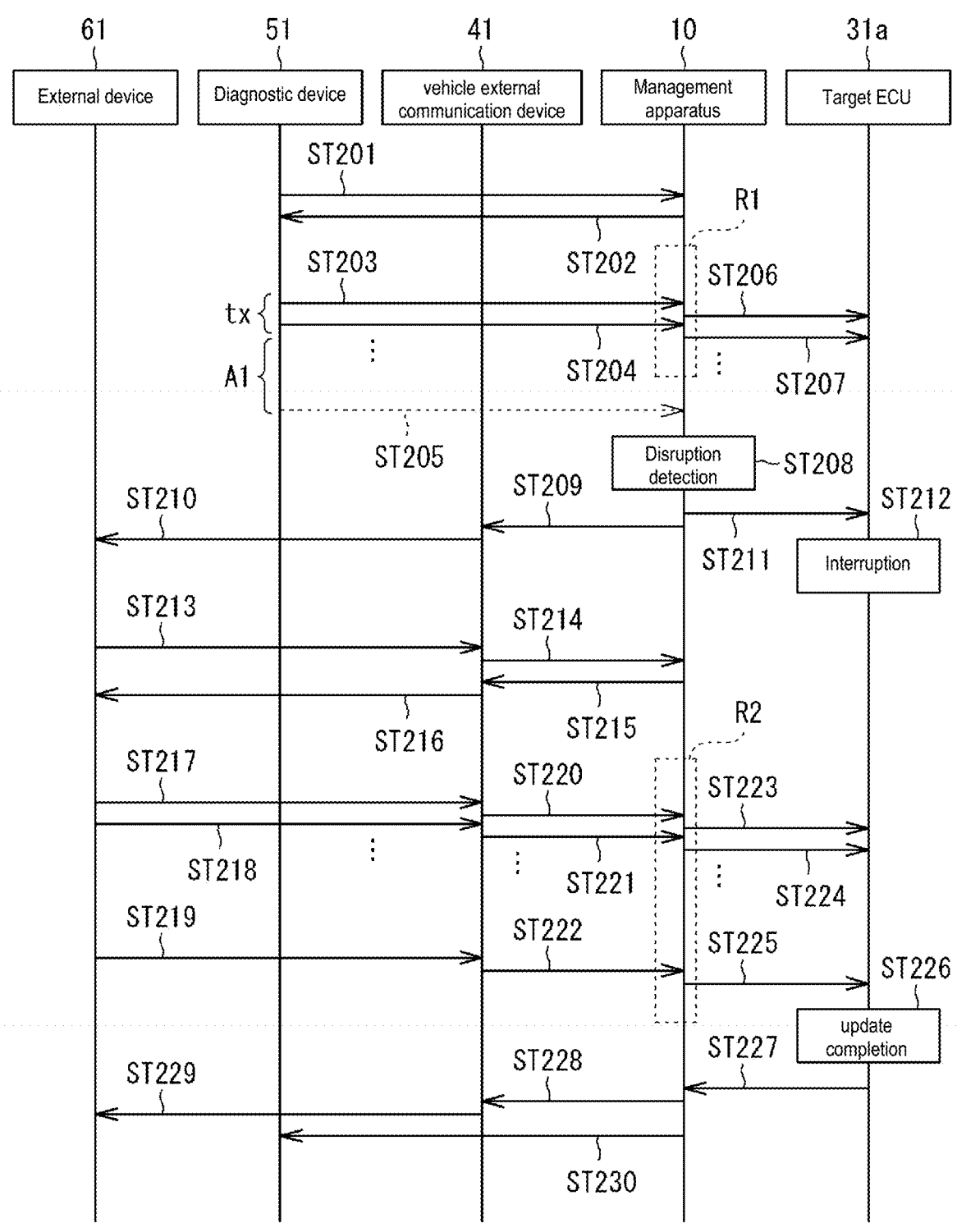
FIG. 4 is a sequence diagram illustrating the management method according to the embodiment.

In the example in FIG. 4, the management apparatus 10 first transmits update data provided by the diagnostic device 51 to the target ECU 31a. When a communication disruption occurs between the diagnostic device 51 and the management apparatus 10 while update data is being provided from the diagnostic device 51 to the management apparatus 10, the management apparatus 10 records a retrial point of the update data. Also, the management apparatus 10 switches the communication path so as to communicate with the external device 61 via the vehicle external communication device 41, and makes a request to the external device 61 for the update data from the retrial point onward.

Accordingly, even if a communication disruption occurs in one communication path, as a result of switching the communication path, the update data can continue to be delivered to an ECU 30, and therefore the time taken for updating can be reduced compared with the case where delivery of the update data is stopped until the communication is recovered. Also, after the communication path is switched, the update data is transmitted from the retrial point onward from the external device 61 to the management apparatus 10, and therefore the amount of communication taken for updating can be reduced, along with the time taken for updating being reduced, compared with the case where the update data is transmitted again from the beginning.

The details of the management method according to the embodiment will be described below with reference to FIGS. 1 to 4 as appropriate.

First, tool authentication for security is executed between the diagnostic device 51 and the management apparatus 10. The diagnostic device 51 transmits an authentication signal to the management apparatus 10 (step ST201). If the authentication signal matches an own signal of the management apparatus 10 that can be authenticated, the management apparatus 10 transmits a signal indicating that the security is to be released to the diagnostic device 51, and establishes communication with the diagnostic device 51 (step ST202).

Next, the diagnostic device 51 divides the update data for updating the target ECU 31a into a plurality of pieces of divided data, and sequentially transmits the plurality of pieces of divided data to the management apparatus 10 (steps ST203, ST204). For example, the diagnostic device 51 transmits, in step ST203, the data at the head of the plurality of pieces of divided data to the management apparatus 10, and transmits, in step ST204, the second data of the plurality of pieces of divided data to the management apparatus 10. The diagnostic device 51 sequentially transmits the plurality of pieces of divided data at a predetermined transmission interval tx. In each piece of divided data, version information of the update data and order information (e.g., a numerical value indicating the transmission order) related to the transmission order of the divided data are stored in addition to the divided update data.

The divided data transmitted from the diagnostic device 51 is received by the third communication unit 13, and thereafter is temporarily stored in the storage unit 22. The control unit 21 extracts the version information and order information from the divided data, and stores the extracted pieces of information in the storage unit 22. The control unit 21 sequentially transmits the pieces of divided data received by the third communication unit 13 to the target ECU 31$a$ from the first communication unit 11$a$ (steps ST206, ST207). That is, the control unit 21 transmits the update data to the target ECU 31$a$ through the first path R1.

As shown in FIG. 3, the control unit 21 first monitors whether or not update data is received (step ST101). Specifically, the control unit 21 monitors whether or not the data at the head (hereinafter, referred to as "head data") of a plurality of pieces of divided data has been input to at least one of the second communication unit 12, third communication unit 13, fourth communication unit 14, and fifth communication unit 15. In the example in FIG. 4, after authentication has been made between the diagnostic device 51 and management apparatus 10, the head data is received by the third communication unit 13 in step ST203, and therefore the control unit 21 determines that update data has been received at the time of step ST203 (YES in step ST101).

Next, the control unit 21 monitors whether or not a disruption in communication with the diagnostic device 51 has occurred in the third communication unit 13 that has received the head data (step ST102). For example, the control unit 21 determines that a disruption in communication between the third communication unit 13 and the diagnostic device 51 has occurred when divided data has not been received by the third communication unit 13 for a predetermined time A1, in a period from when the head data is received by the third communication unit 13 until when the data at the end of the plurality of pieces of divided data is received by the third communication unit 13 (YES in step ST102).

In the example in FIG. 4, after step ST204, a communication abnormality has occurred between the diagnostic device 51 and the third communication unit 13, and the third communication unit 13 has not received the third and subsequent pieces of data of the plurality of pieces of divided data in a period during which the predetermined time A1 elapses from step ST204 (step ST205). Therefore, the control unit 21 determines that a communication disruption has occurred in the third communication unit 13 (YES in step ST102, and step ST208).

FIG. 5 is a table illustrating the predetermined time A1 according to the embodiment. In FIG. 5, a predetermined time A2 is also illustrated as a modification of the predetermined time A1. The control unit 21 calculates the predetermined time A1 based on a transmission interval tx of the divided data. The storage unit 22 stores an individual transmission interval tx in a table format, for example, for each of the communication lines 34 and 35 (or for each ECU 30). For example, the storage unit 22 stores a transmission interval t1 of the ECU 31, a transmission interval t2 of the ECU 32, and a transmission interval t3 of the ECU 33. Also, the storage unit 22 stores a coefficient F1 for calculating the predetermined time A1. The coefficient F1 is an integer of 2 or more, and 3, for example.

The control unit 21 calculates the predetermined time A1 by multiplication between the coefficient F1 and the transmission interval tx (A1=F1×tx). Therefore, the predetermined time A1 takes a different value according to the transmission interval tx of the divided data for the target ECU. In the example in FIG. 4, the target ECU is the ECU 31$a$, and therefore the predetermined time A1 is (F1×t1).

The control unit 21 can accurately determine a communication disruption based on the predetermined time A1.

Note that the control unit 21 may monitor whether or not a communication disruption has occurred based on the predetermined time A2, which is a fixed value, instead of the predetermined time A1. The predetermined time A2 is a timeout time (Tout), for example, and is stored in a storage unit 22 as the same value for a plurality of target ECUs, for example. The timeout time takes a sufficiently large value relative to the transmission interval tx, and is three times or more the largest transmission interval of the transmission intervals t1 to t3, for example. The predetermined time A2 is the same value for the plurality of target ECUs, and therefore the used capacity of the storage unit 22 can be reduced, and the processing load of the control unit 21 can be reduced, relative to the case where the predetermined time A1 is adopted.

FIG. 3 is referred to. Upon determining a communication disruption, the control unit 21 stores, in the storage unit 22, various types of information included in the divided data (second divided data in the example in FIG. 4) received by the third communication unit 13 immediately before the communication disruption occurred, as interruption information (step ST103). The interruption information includes version information, order information of the divided data (e.g., a numerical value indicating the transmission order of the divided data, and is "2" in the example in FIG. 4), the type of the target ECU 31$a$, and the type of the update data.

The control unit 21 acquires a retrial point of the update data based on the order information of the divided data. The retrial point is a position for resuming reception of update data from partway through, after the communication disruption has occurred. In the example in FIG. 4, pieces of divided data up to second divided data have been received by the third communication unit 13, and a communication disruption occurred before the third divided data is received, and therefore when the reception of the update data is resumed from partway through, the reception is resumed from the third divided data. For example, the control unit 21 acquires a value obtained by adding "1" to the transmission order of the divided data shown in the order information as the retrial point.

Next, the control unit 21 selects, from the plurality of paths, the second path R2, third path R3, or fourth path R4 that does not pass the third communication unit 13 in which the communication disruption occurred (step ST104). For example, the storage unit 22 stores a table related to the priority levels of the plurality of paths. In the table, a higher priority level is set for a path whose communication speed is higher, for example.

If the first path R1 (third communication unit 13), the second path R2 (second communication unit 12), the third path R3 (fourth communication unit 14), and the fourth path R4 (fifth communication unit 15) are set in the table in descending order of priority level, the control unit 21 selects the second path R2 whose priority level is highest next to the first path R1, in step ST104.

Next, the control unit 21 determines whether or not the target ECU 31$a$ can be updated from partway through update data based on the interruption information (step ST105). For example, the control unit 21 determines whether or not the target ECU 31$a$ is an ECU that can be updated from partway through update data based on the type of the target ECU 31$a$ included in the interruption information.

For example, if the target ECU 31$a$ is a device related to traveling control (control of a braking device, for example) of a vehicle V1, the ECU 31$a$ needs to be accurately updated even if it takes some more time for updating, and therefore the control unit 21 determines that the ECU 31*a* cannot be updated from partway through the update data (NO in step ST105). Also, if the target ECU 31*a* is a device related to control other than the control of traveling of the vehicle V1 (e.g., control of an air conditioner), the reduction in update time is more prioritized, and therefore the control unit 21 determines that the ECU 31*a* can be updated from partway through update data (YES in step ST105).

The type of the target ECU 31*a* included in the interruption information may be represented by one of the four levels A, B, C, and D included in the automotive safety integrity level (ASIL) defined in the ISO 26262 standard. In this case, if the type of the target ECU 31*a* is in a predetermined level (e.g., level B) or lower (that is, level A or B), the control unit 21 may determine that the ECU 31*a* can be updated from partway through update data, and if the type of the target ECU 31*a* is in a level higher than the predetermined level (that is, level C or D), the control unit 21 may determine that the ECU 31*a* cannot be updated from partway through update data.

Also, the control unit 21 determines whether or not the update data is a program or data that can be updated from partway through based on the type of update data included in the interruption information. The type of update data included in the interruption information may be represented by one of the four levels A, B, C, and D included in the ASIL. In this case, if the type of update data is in a predetermined level (e.g., level B) or lower (that is, level A or B), the control unit 21 may determine that updating is possible from partway through the update data, and if the type of update data is in a level higher than the predetermined level (that is, level C or D), the control unit 21 may determine that updating is not possible from partway through the update data.

Upon determining that the target ECU 31*a* can be updated from partway through update data, the control unit 21 requests the communication destination of the path selected in step ST104 to transmit the update data from the retrial point onward (step ST106).

FIG. 4 is referred to. Specifically, the control unit 21 transmits a request signal to the vehicle external communication device 41 that is the communication destination of the selected second path R2 (step ST209). The vehicle external communication device 41 transfers the request signal to the external device 61 via the network N1 (step ST210).

The request signal includes a communication disruption notification for notifying that a communication disruption has occurred between the diagnostic device 51 and the third communication unit 13, a switching notification for notifying that the path is to be switched from the first path R1 to the second path R2, information regarding the retrial point (e.g., a numerical value indicating the retrial point), and version information included in the interruption information, for example.

The control unit 21 may, in relation to step ST106, transmit an interrupt signal for communicating that the updating is temporarily interrupted to the target ECU 31*a* (step ST211). Upon receiving the interrupt signal, the target ECU 31*a* temporarily interrupts the updating, and waits for reception of the next divided data (step ST212).

The external device 61 that has received the request signal executes server authentication for security in order to establish communication with the management apparatus 10 via the vehicle external communication device 41. The external device 61 transmits an authentication signal to the management apparatus via the vehicle external communication device 41 (steps ST213, ST214). If the authentication signal matches an own signal of the management apparatus 10 that can be authenticated, the management apparatus 10 transmits a signal indicating that the security is to be released to the external device 61 via the vehicle external communication device 41, and establishes communication with the external device 61 (steps ST215, ST216).

Next, the external device 61 prepares the update data for updating the target ECU 31*a*. First, the external device 61 prepares update data having version information that is the same as the version information included in the request signal. Next, the external device 61 divides the update data into a plurality of pieces of divided data, and sequentially transmits the plurality of pieces of divided data after the retrial point to the vehicle external communication device 41 based on information regarding the retrial point included in the request signal (steps ST217, ST218, ST219). The vehicle external communication device 41 sequentially transfers the plurality of pieces of divided data transmitted from the external device 61 to the management apparatus 10 (steps ST220, ST221, ST221).

For example, the external device 61 transmits third divided data to the management apparatus 10 in step ST217, and transmits fourth divided data of the update data to the management apparatus 10 in step ST218. In this way, the external device 61 sequentially transmits the third and subsequent pieces of divided data, and transmits end divided data to the management apparatus 10 in step ST219.

The pieces of divided data transferred from the vehicle external communication device 41 are received by the second communication unit 12, and thereafter are temporarily stored in the storage unit 22. The control unit 21 extracts version information and order information from the divided data, and stores them in the storage unit 22. The control unit 21 sequentially delivers the pieces of divided data received by the second communication unit 12 from the first communication unit 11*a* to the target ECU 31*a* (step ST109). That is, the control unit 21 outputs the pieces of update data from the retrial point onward to the target ECU 31*a* through the second path R2 (steps ST223, ST224, ST225).

Upon receiving the third and subsequent pieces of divided data from the management apparatus 10 in steps ST223 and ST224, the target ECU 31*a* successively resumes the updating. Then, the target ECU 31*a* completes the updating based on the end divided data that was received in step ST225 (step ST226). When the updating is completed, the target ECU 31*a* transmits a completion notification for notifying that the updating is completed to the management apparatus 10 (step ST227).

Upon receiving the completion notification from the target ECU 31*a*, the management apparatus 10 transmits the completion notification to both of an input origin of the first path R1 and an input origin of the second path R2 (step ST110). Specifically, the management apparatus 10 transmits the completion notification to the vehicle external communication device 41, which is the input origin of the second path R2 after switching (step ST228). Upon receiving the completion notification, the vehicle external communication device 41 transfers the completion notification to the external device 61 via the network N1 (step ST229).

After receiving the completion notification from the target ECU 31*a*, the management apparatus 10 also transmits the completion notification to the diagnostic device 51, which is the input origin of the first path R1 before switching, when the communication between the diagnostic device 51 and management apparatus 10 is recovered (step ST230).

Accordingly, the diagnostic device 51 can understand that the target ECU 31*a* has completed updating, and therefore the diagnostic device 51 can be prevented from again transmitting the update data to the management apparatus 10.

As described above, in the example in FIG. 4, even in a case where a communication disruption has occurred between the diagnostic device 51 and the management apparatus 10, as a result of the management apparatus 10 switching the communication path of update data to a path that passes the vehicle external communication device 41, the update data can continue to be delivered to the target ECU 31*a*. Accordingly, the time taken to update the target ECU 31*a* can be reduced compared with the case where the delivery of update data is stopped until the communication between the diagnostic device 51 and the management apparatus 10 is recovered.

Also, after the communication path has been switched, the update data from the retrial point onward is transmitted from the external device 61 to the management apparatus 10, and the management apparatus 10 delivers the update data from the retrial point onward to the target ECU 31*a*, and therefore the time taken for updating can be reduced, and the amount of communication needed for updating can also be reduced, compared with the case where the transmission of the update data is performed again from the beginning.

Second Exemplary Control

Figure 6:
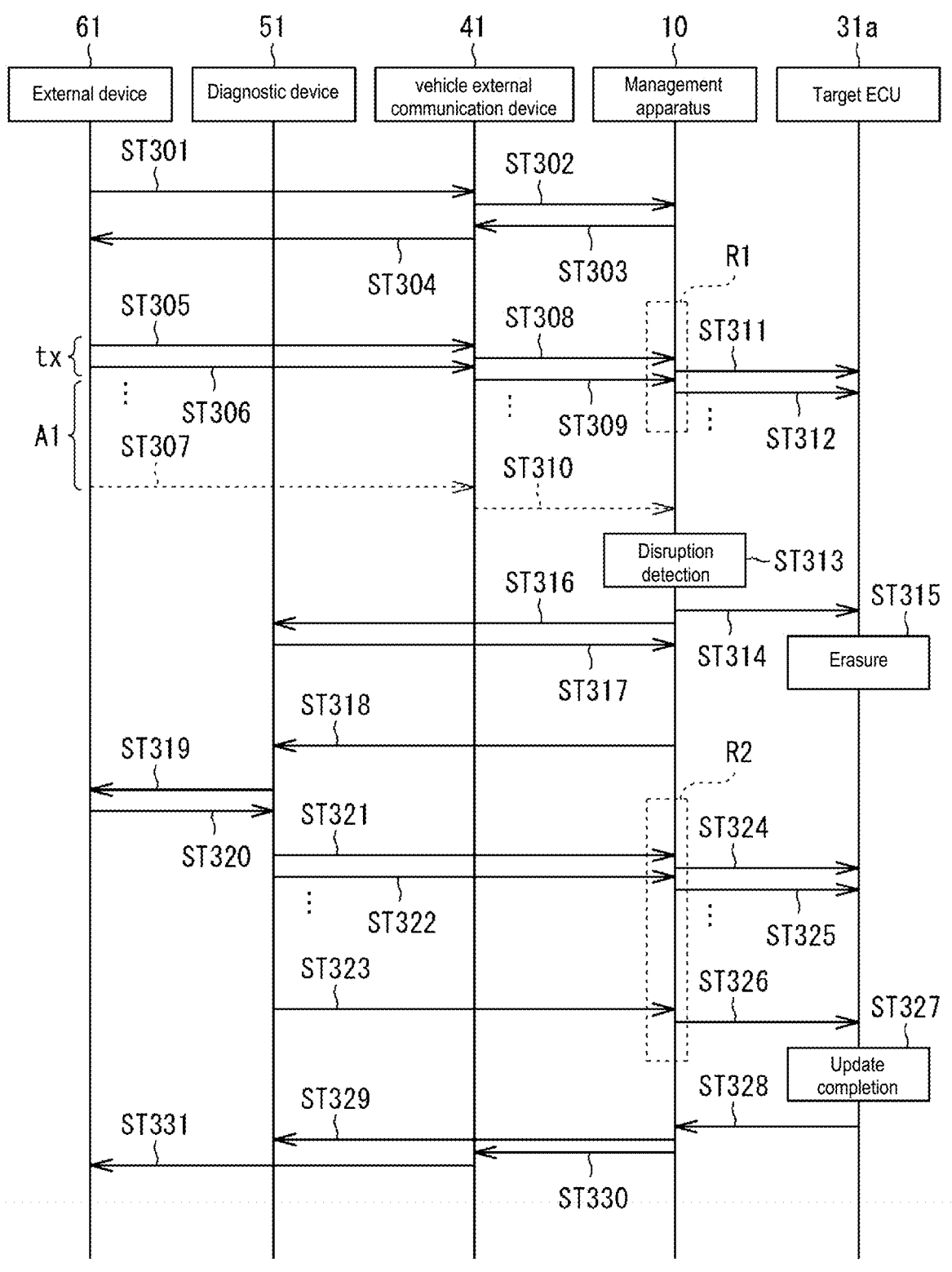
FIG. 6 is a sequence diagram illustrating the management method according to the embodiment.

FIG. 6 is a sequence diagram illustrating the management method according to the embodiment (second exemplary control).

In the example in FIG. 6, the management apparatus 10 first outputs update data provided from the external device 61 to the vehicle external communication device 41 to a target ECU 31*a*. When a communication disruption has occurred between the external device 61 and the management apparatus 10, the management apparatus 10 switches the communication path so as to communicate with the diagnostic device 51, and makes a request to the diagnostic device 51 for update data.

Accordingly, even in a case where a communication disruption has occurred in any of the communication paths, as a result of switching the communication path, the update data can be continuously delivered to an ECU 30, and therefore the time taken for updating can be reduced compared with the case where the delivery of update data is stopped until the communication is recovered.

The second exemplary control (FIG. 6) differs from the first exemplary control (FIG. 4) in that the communication path with the external device 61 via the vehicle external communication device 41 is switched to a communication path with the diagnostic device 51. Also, the second exemplary control differs from the first exemplary control in that when a communication disruption has occurred, the part of the update data with which the target ECU 31*a* has been partway updated is erased, and after the communication path is switched to the communication path with the diagnostic device 51, updating is again performed from the beginning of the update data. That is, the second exemplary control is exemplary control to follow the route selected when NO is determined in step ST105 in the flowchart in FIG. 3.

The second exemplary control of the management method according to the embodiment will be described below with reference to FIGS. 1 to 3 and FIG. 6, as appropriate. In the second exemplary control, description of items that are in common with the first exemplary control will be omitted as appropriate.

First, authentication for security is executed between the external device 61 and the management apparatus 10. The external device 61 transmits an authentication signal to the management apparatus 10 via the vehicle external communication device 41 (steps ST301, ST302). If the authentication signal matches an own signal of the management apparatus 10 that can be authenticated, the management apparatus 10 transmits a signal indicating that the security is to be released to the external device 61 via the vehicle external communication device 41 (steps ST303, ST304). Accordingly, communication between the external device 61 and the management apparatus 10 is established.

Next, the external device 61 divides the update data for updating the target ECU 31*a* into a plurality of pieces of divided data, and sequentially transmits the plurality of pieces of divided data to the vehicle external communication device 41 (steps ST305, ST306). The vehicle external communication device 41 sequentially transfers the plurality of pieces of divided data to the management apparatus 10 (steps ST308, ST309). Each piece of divided data from the vehicle external communication device 41 is received by the second communication unit 12, and thereafter temporarily stored in the storage unit 22. The control unit 21 extracts version information and order information from the divided data, and stores them in the storage unit 22. The control unit 21 sequentially transmits the divided data received by the second communication unit 12 to the target ECU 31*a* from the first communication unit 11*a* (steps ST311, ST312). That is, the control unit 21 transmits the update data to the target ECU 31*a* through the first path R1. In the second exemplary control, the first path R1 is a path for transmitting the update data received by the second communication unit 12 from the first communication unit 11*a*.

As shown in FIG. 3, the control unit 21 monitors whether or not update data is received (step ST101). In the example in FIG. 6, after authentication has been made between the external device 61 and management apparatus 10, the head divided data is input to the second communication unit 12 in step ST308, and therefore the control unit 21 determines that update data has been received at the time of step ST308 (YES in step ST101).

Next, the control unit 21 monitors whether or not a disruption in communication with the external device 61 has occurred in the second communication unit 12 that has received the head data (step ST102). For example, the control unit 21 determines that a disruption in communication between the second communication unit 12 and the external device 61 has occurred when divided data is not received by the second communication unit 12 for a predetermined time A1, in a period from when the head data is received by the second communication unit 12 until when the data at the end of the plurality of pieces of divided data is received by the second communication unit 12 (YES in step ST102).

In the example in FIG. 6, after steps ST306 and ST309, a communication abnormality has occurred between the external device 61 and the second communication unit 12, and the second communication unit 12 has not received the third and subsequent pieces of divided data of the plurality of pieces of divided data in a period during which the predetermined time A1 elapses from when step ST309 was executed (step ST310). Therefore, the control unit 21 determines that a communication disruption has occurred in the second communication unit 12 (YES in step ST102, and step ST313).

Here, the communication disruption between the second communication unit 12 and the external device 61 includes a case where a communication disruption occurs between the external device 61 and the vehicle external communication device 41 (a case where data cannot be transmitted in step ST307), and a case where a communication disruption occurs between the vehicle external communication device 41 and the second communication unit 12 while valid communication is possible between the external device 61 and the vehicle external communication device 41 (a case where data can be transmitted in step ST307, but data cannot be transmitted in step ST310).

Upon determining a communication disruption, the control unit 21 stores, in the storage unit 22, various types of information included in the divided data (second divided data in the example in FIG. 6) received by the second communication unit 12 immediately before the communication disruption occurred, as interruption information (step ST103). Next, the control unit 21 selects a path that does not pass through the second communication unit 12 in which the communication disruption has occurred (e.g., the second path R2 that passes through the third communication unit 13) from a plurality of paths (step ST104).

Next, the control unit 21 determines whether or not the target ECU 31a can be updated from partway through update data based on the interruption information (step ST105). The type of update data in the example in FIG. 6 is data that needs to be accurately updated, for example, and therefore the control unit 21 determines that the target ECU 31a cannot be updated from partway through the update data (NO in step ST105).

In this case, the control unit 21 outputs an erasure instruction for erasing the update data (first and second pieces of divided data) that has already been transmitted to the target ECU 31a (steps ST107, ST314). Upon receiving input of the erasure instruction, the target ECU 31a erases the pieces of divided data received in steps ST311 and ST312, and returns to the state before updating (step ST315).

Note that when the target ECU 31a is set such that the received pieces of divided data are erased if update is not completed within a predetermined time A3, steps ST314 and ST315 may be omitted. The predetermined time A3 is a timeout time of a period from when updating was started until when updating is completed in the target ECU 31a, and is longer than the predetermined times A1 and A2, for example.

Next, the control unit 21 requests the communication destination of the path selected in step ST104 to transmit a plurality of pieces of divided data from the head data thereof (step ST108). Specifically, the control unit 21 transmits a request signal for requesting the diagnostic device 51, which is the input origin of the selected second path R2, to transmit pieces of divided data from the head data (step ST316). The request signal includes a signal for requesting that the update data of the diagnostic device 51 and the update data of the external device 61 (input origin of the first path R1) are synchronized. Specifically, the request signal includes a signal for requesting that the diagnostic device 51 acquires, from the external device 61, update data having version information that is the same as that of update data output from the first path R1.

The diagnostic device 51 that has received the request signal executes tool authentication for security in order to establish communication with the management apparatus 10. The diagnostic device 51 transmits an authentication signal to the management apparatus 10 (step ST317). If the authentication signal matches an own signal of the management apparatus 10 that can be authenticated, the management apparatus 10 transmits a signal indicating that the security is to be released to the diagnostic device 51, and establishes communication with the diagnostic device 51 (step ST318).

Next, the diagnostic device 51 prepares update data for updating the target ECU 31a. First, the diagnostic device 51 prepares update data having version information that is the same as the version information included in the request signal (version information of the update data output from the first path R1). Specifically, the diagnostic device 51 confirms whether or not update data having the version information is stored in its own storage unit.

If the update data having the version information is not stored in the storage unit of the diagnostic device 51, the diagnostic device 51 transmits a signal for requesting transmission of update data having the version information to the external device 61 via the network N1 (step ST319). Upon receiving the signal, the external device 61 transmits the update data having the same version information to the diagnostic device 51 (step ST320). With this, the update data is synchronized between the diagnostic device 51 and the external device 61.

If the update data having the version information is stored in the storage unit of the diagnostic device 51, the diagnostic device 51 and the external device 61 are already synchronized, and therefore steps ST319 and ST320 may be omitted.

Next, the diagnostic device 51 divides the update data having the version information into a plurality of pieces of divided data, and sequentially transmits the plurality of pieces of divided data from the head divided data to the management apparatus 10 (steps ST321, ST322, ST323). For example, the diagnostic device 51 transmits the head divided data to the management apparatus 10 in step ST321, and transmits the second divided data to the management apparatus 10 in step ST322, for example. The diagnostic device 51 sequentially transmits the plurality of pieces of divided data in this way, and in step ST323, transmits the divided data at the end of the plurality of pieces of divided data to the management apparatus 10.

The divided data transmitted from the diagnostic device 51 is received by the third communication unit 13, and thereafter temporarily stored in the storage unit 22. The control unit 21 extracts version information and order information from the divided data, and stores them in the storage unit 22. The control unit 21 sequentially delivers the divided data received by the third communication unit 13 to the target ECU 31a from the first communication unit 11a (steps ST109). That is, the control unit 21 sequentially transmits the plurality of pieces of divided data to the target ECU 31a from the head data through the second path R2 (steps ST324, ST325, ST326).

Upon receiving the head data from the management apparatus 10 in step ST324, the target ECU 31a again performs updating from the start. Then, the target ECU 31a completes the updating based on the end data received in step ST326 (step ST327). When the updating is complete, the target ECU 31a transmits a completion notification notifying that the updating is complete to the management apparatus 10 (step ST328).

Upon receiving the completion notification from the target ECU 31a, the management apparatus 10 transmits the completion notification to both of the communication destination of the first path R1 and the communication destination of the second path R2 (step ST110). Specifically, the management apparatus 10 transmits the completion notification to the diagnostic device 51, which is the communication destination of the second path R2 after switching (step ST329).

After receiving the completion notification from the target ECU 31a, the management apparatus 10 also transmits the completion notification to the external device 61, which is the communication destination of the first path R1 before switching, when the communication between the external device 61 and the management apparatus 10 via the vehicle external communication device 41 is recovered (steps ST330, ST331). Accordingly, the external device 61 understands that the target ECU 31a has completed updating, and therefore the external device 61 can be prevented from transmitting the update data again to the management apparatus 10.

As described above, in the example in FIG. 6, even in a case where a communication disruption has occurred between the external device 61 and the management apparatus 10, as a result of the management apparatus 10 switching the communication path of the update data to a path that passes through the diagnostic device 51, the update data can continue to be delivered to the target ECU 31a. Accordingly, the time taken to update the target ECU 31a can be reduced compared with the case where the delivery of update data is stopped until the communication between the external device 61 and the management apparatus 10 is recovered.

Modifications

Modifications of the embodiment will be described below. In the following modifications, the constituent elements that are the same as those of the embodiment are given the same reference numerals, and the description thereof will be omitted.

Modification of Target ECU

In the description described above, an example in which the ECU 31a is the target ECU has been described, but the target ECU may be any of the ECUs 30. Also, a plurality of ECUs 30 may be set as the target ECU. For example, the target ECU may include an ECU 31b (hereinafter, referred to as a "first target ECU 31b") and an ECU 32b (hereinafter, referred to as a "second target ECU 32b").

In this case, the path priority levels are set for each of the plurality of target ECUs, and the control unit 21 may determine the switching destination path when a communication disruption has occurred according to the priority levels set for each of the plurality of target ECUs.

FIG. 7 is a table illustrating the priority levels according to a modification. The table is stored in the storage unit 22 and is updated when an ECU is newly registered or when an ECU is updated. The types of ECUs, the update contents thereof, and the priority levels 1 to 6 are listed in the table, for example. Priority level 1 indicates the path at the highest priority level, and priority level 6 indicates the path at the lowest priority level.

For example, when the target ECU is the ECU 31, and the update content is an application (program update), the paths at priority levels 1 to 6 are as follows, for example.

Priority level 1: Path of update data that is received by the third communication unit 13 from the diagnostic device 51 through the communication line 52 (DoCAN) (DoCAN path).

Priority level 2: Path of update data that is received by the fourth communication unit 14 from the diagnostic device 51 through the communication line 53 (DoIP) (DoIP path).

Priority level 3: Path of update data that is received by the second communication unit 12 via the vehicle external communication device 41.

Priority level 4: Path of update data that is received by the fifth communication unit 15 from the recording medium 72 via the information acquisition device 42.

Priority level 5: Path of update data that is received by the fifth communication unit 15 from the terminal 73 via the information acquisition device 42.

Priority level 6: Path of update data that is received by the fifth communication unit 15 from the external device 61 via the wireless communication interface 75 and the information acquisition device 42.

In the case of the ECU 31, faster communication is possible when using the communication line 52 of the same standard as the communication line 34 than when using the communication line 53, and therefore the DoCAN path is at priority level 1. On the other hand, in the case of the ECU 32, faster communication is possible when using the communication line 53 of the same standard as the communication line 35 than when using the communication line 52, and therefore the DoIP path is at priority level 1 and the DoCAN path is at priority level 2.

In the case of the ECU 33, the ECU 33 is connected to both of the communication lines 34 and 35, and therefore faster communication is possible when using the communication line 53 having faster communication speed than when using the communication line 52. Therefore, in the case of the ECU 33, the DoIP path is at priority level 1 and the DoCAN path is at priority level 2. Regarding the ECUs 32 and 33, priority levels 3 to 6 are the same as priority levels 3 to 6 set for the ECU 31.

The information acquisition device 42 is one type of the ECU, and therefore there are cases where the information acquisition device 42 is the target ECU. When the target ECU is the information acquisition device 42, and the update content is an application (program update), the paths at priority levels 1 to 6 are the same as the case of the ECU 31, for example.

Also, when the target ECU is the information acquisition device 42, and the update content is map information (data update), the paths at priority levels 1 to 6 are as follows, for example.

Priority level 1: Path of update data that is received by the fifth communication unit 15 from the recording medium 72 via the information acquisition device 42.

Priority level 2: Path of update data that is received by the fifth communication unit 15 from the terminal 73 via the information acquisition device 42.

Priority level 3: Path of update data that is received by the third communication unit 13 from the diagnostic device 51 through the communication line 52 (DoCAN) (DoCAN path).

Priority level 4: Path of update data that is received by the fourth communication unit 14 from the diagnostic device 51 through the communication line 53 (DoIP) (DoIP path).

Priority level 5: Path of update data that is received by the second communication unit 12 via the vehicle external communication device 41.

Priority level 6: Path of update data that is received by the fifth communication unit 15 from the external device 61 via the wireless communication interface 75 and the information acquisition device 42.

When an enormous amount of data such as map information is updated, in order to prevent the most of the communication capacity from being consumed, it is preferable that the update data is directly input to the information acquisition device 42 from the recording medium 72.

A case is considered where the table such as that shown in FIG. 7 is stored in the storage unit 22, first update data for updating the first target ECU 31b and second update data for updating the second target ECU 32b are received by the second communication unit 12 from the external device 61 via the vehicle external communication device 41, for example, the first update data is transmitted from the first communication unit 11a to the first target ECU 31b, and the second update data is transmitted to the second target ECU 32b from the first communication unit 11b.

When a communication disruption occurs between the external device 61 and the management apparatus 10 in this case, the control unit 21 switches the path through which the first update data passes to the path (DoCAN path) at priority level 1 set for the ECU 31, based on the priority levels listed in the table stored in the storage unit 22. Also, the control unit 21 switches the path through which the second update data passes to the path (DoIP path) at priority level 1 set for the ECU 32.

Accordingly, when a communication disruption occurs, the path can be switched to a more suitable path according to the ECU, and therefore the time taken for updating can be reduced.

Modification of Control Unit

The control unit 21 of the embodiment executes path switching when a communication disruption occurs. However, the control unit 21 may also execute path switching even when a communication disruption is not occurring. For example, in the example in FIG. 4, when, after steps ST203 and ST204, the speed of reception of divided data by the management apparatus 10, which is indicated in step ST205, decreases to below a predetermined speed although the transmission of divided data from the diagnostic device 51 to the management apparatus 10 continues, the control unit 21 may determine that "a communication abnormality is present", and may execute path switching, similarly to the example in FIG. 4.

In such a case as well, the time taken to update the target ECU can be reduced, compared with the case where the path is not switched.

Supplementary Note

Note that, with respect to the embodiment and various modifications, at least some of them may be combined as necessary. Also, the embodiment disclosed herein is illustrative in all aspects and should not be considered restrictive. The scope of the present disclosure is indicated by the scope of claims, and is intended to include all modifications within the meaning and scope equivalent to the scope of claims.

The invention claimed is:

1. A management apparatus that is a management apparatus to be mounted on a vehicle, the management apparatus comprising:

a first communication unit configured to communicate with a target ECU that is to be updated out of one or more ECUs that are mounted on the vehicle;

a second communication unit that is configured to communicate with an onboard vehicle external communication device, and is able to receive update data for the target ECU that is transmitted from a first external device external to the vehicle to the vehicle external communication device via a network;

a third communication unit that is configured to communicate with a second external device external to the vehicle, and is able to receive the update data; and a control unit configured to cause the first communication unit to transmit the update data received by the second communication unit or the third communication unit to the target ECU, wherein the control unit performs switching from a first path through which the update data received by one of the second communication unit and the third communication unit is transmitted from the first communication unit to a second path through which the update data received by the other of the second communication unit and the third communication unit is transmitted from the first communication unit.

2. The management apparatus according to claim 1, wherein the control unit determines a communication disruption if, in a period from when data at the head of a plurality of pieces of divided data obtained by dividing the update data is received through the first path until when data at the end of the plurality of pieces of divided data is received through the first path, the divided data is not received through the first path for a predetermined time, and upon determining the communication disruption, the control unit performs switching from the first path to the second path.

3. The management apparatus according to claim 2, wherein the control unit causes the first communication unit to sequentially transmit the plurality of pieces of divided data at a transmission interval set according to the target ECU, and the predetermined time is a time that is twice the transmission interval or more.

4. The management apparatus according to claim 2, wherein the first communication unit communicates with a plurality of the target ECUs, and the predetermined time is a time that is set as a same value for the plurality of target ECUs.

5. The management apparatus according to claim 1, wherein when the communication disruption has been determined, the control unit acquires a retrial point of the update data for resuming updating of the target ECU from partway through the update data, and when switching from the first path to the second path has been performed, the control unit causes the first communication unit to transmit, out of the pieces of divided data, data from the retrial point onward to the target ECU.

6. The management apparatus according to claim 5, wherein when the communication disruption has been determined, the control unit determines whether updating of the target ECU is to be resumed from partway through the update data or updating of the target ECU is to be started again from the beginning of the update data, according to the target ECU or the update data.

7. The management apparatus according to claim 5, wherein the control unit acquires the retrial point based on information regarding a transmission order of the divided data transmitted from the first communication unit through the first path before the communication disruption is determined.

8. The management apparatus according to claim 5, wherein the control unit causes the second communication unit or third communication unit to transmit a signal for making a request to the first external device or the second external device, which is a communication destination of the second path, for data from the retrial point onward, out of the pieces of divided data.

9. The management apparatus according to claim 1, wherein the second external device is a diagnostic device that can receive the update data from the first external device via a network.

10. The management apparatus according to claim 9, wherein the first path is a path for transmitting the update data received by the second communication unit from the first communication unit, the second path is a path for transmitting the update data received by the third communication unit from the first communication unit, and when performing switching from the first path to the second path, the control unit requests the diagnostic device to acquire, from the first external device, update data having version information that is the same as that of the update data transmitted through the first path.

11. The management apparatus according to claim 1, further comprising-including at least one of:

a fourth communication unit configured to communicate with the second external device through a communication line conforming to a communication protocol that is different from that of the third communication unit, and a fifth communication unit configured to communicate with an information acquisition device that acquires the update data from the first external device via a network or from a recording medium, and the control unit performs switching from the first path to the second path, a third path through which the update data received by the fourth communication unit is transmitted from the first communication unit, or a fourth path through which the update data received by the fifth communication unit is transmitted from the first communication unit.

12. The management apparatus according to claim 11, wherein the first communication unit communicates with a plurality of the target ECUs, and the control unit determines a switching destination path according to priority levels of paths set for each of the plurality of target ECUs.

13. A management system that is an onboard management system, comprising:

the management apparatus according to claim 1;

the target ECU connected to the first communication unit; and the vehicle external communication device connected to the second communication unit.

14. A management method for a management apparatus to manage updating of one or more ECUs that are mounted on a vehicle, wherein the management apparatus includes:

a first communication unit configured to communicate with a target ECU that is to be updated out of the one or more ECUs;

a second communication unit that is configured to communicate with an onboard vehicle external communication device, and is able to receive update data for the target ECU that is transmitted from a first external device external to the vehicle to the vehicle external communication device via a network; and a third communication unit that is configured to communicate with a second external device external to the vehicle, and is able to receive the update data, and the management method comprises a step of performing switching from a first path through which the update data received by one of the second communication unit and the third communication unit is transmitted from the first communication unit to a second path through which the update data received by the other of the second communication unit and the third communication unit is transmitted from the first communication unit.

15. A computer program for a management apparatus to manage updating of one or more ECUs that are mounted on a vehicle, wherein the management apparatus includes:

a first communication unit configured to communicate with a target ECU that is to be updated out of the one or more ECUs;

a second communication unit that is configured to communicate with an onboard vehicle external communication device, and is able to receive update data for the target ECU that is transmitted from a first external device external to the vehicle to the vehicle external communication device via a network; and a third communication unit that is configured to communicate with a second external device external to the vehicle, and is able to receive the update data, and the computer program causes a computer to execute a step of performing switching from a first path through which the update data received by one of the second communication unit and the third communication unit is transmitted from the first communication unit to a second path through which the update data received by the other of the second communication unit and the third communication unit is transmitted from the first communication unit.

* * * * *